US 6,626,953 B2

(12) United States Patent
Johndrew et al.

(10) Patent No.: US 6,626,953 B2
(45) Date of Patent: Sep. 30, 2003

(54) SYSTEM AND METHOD FOR RETRIEVING SOFTWARE RELEASE INFORMATION

(75) Inventors: Thomas M. Johndrew, Aptos, CA (US); Sanjeev K. Gupta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/058,943

(22) Filed: Apr. 10, 1998

(65) Prior Publication Data

US 2001/0049697 A1 Dec. 6, 2001

(51) Int. Cl.[7] ............ G06F 15/00; G06F 17/24; G06F 17/21; G06F 17/00
(52) U.S. Cl. .......... 715/500; 703/22; 717/178; 717/175; 709/221
(58) Field of Search ............... 707/203, 500; 395/701, 704, 712; 703/22; 709/217, 221; 711/133; 717/11, 4, 5, 1, 175, 177

(56) References Cited

U.S. PATENT DOCUMENTS

| | | | | |
|---|---|---|---|---|
| 4,827,411 A | | 5/1989 | Arrowood et al. .......... 707/206 |
| 4,843,599 A | * | 6/1989 | Bucker .................. 367/70 |
| 5,490,088 A | | 2/1996 | Landis et al. ............ 709/237 |
| 5,560,005 A | | 9/1996 | Hoover et al. ............ 707/10 |
| 5,608,898 A | | 3/1997 | Turpin et al. ............ 707/201 |
| 5,621,721 A | | 4/1997 | Vatuone .................. 370/394 |
| 5,623,662 A | | 4/1997 | McIntosh ................ 707/204 |
| 5,655,074 A | * | 8/1997 | Rauscher ............. 395/183.01 |
| 5,701,457 A | | 12/1997 | Fujiwara ................. 707/8 |
| 5,729,744 A | * | 3/1998 | Gerken et al. ............ 395/619 |
| 5,761,662 A | | 6/1998 | Dasan .................... 707/10 |
| 5,809,287 A | * | 9/1998 | Stupek, Jr. et al. ......... 703/22 |
| 5,826,253 A | | 10/1998 | Bredenberg .............. 707/2 |
| 5,832,522 A | | 11/1998 | Blickenstaff et al. ....... 707/204 |
| 5,835,911 A | | 11/1998 | Nakagawa et al. ......... 707/203 |
| 5,850,433 A | | 12/1998 | Rondeau ................. 379/201 |
| 5,866,331 A | * | 2/1999 | Singer et al. ............. 435/6 |
| 5,867,495 A | | 2/1999 | Elliott et al. ............ 370/352 |
| 5,873,103 A | | 2/1999 | Trede et al. ............. 707/204 |
| 5,895,461 A | | 4/1999 | De La Huerga et al. ..... 707/1 |
| 5,907,705 A | * | 5/1999 | Carter ................... 717/1 |
| 5,913,037 A | | 6/1999 | Spofford et al. .......... 709/226 |
| 5,930,474 A | | 7/1999 | Dunworth et al. ......... 709/217 |
| 5,956,732 A | * | 9/1999 | Tsuchida ................ 707/203 |
| 5,960,196 A | * | 9/1999 | Carrier, III et al. ....... 395/701 |
| 5,974,454 A | * | 10/1999 | Apfel et al. ............. 709/221 |
| 5,999,740 A | * | 12/1999 | Rowley .................. 717/11 |
| 6,074,434 A | * | 6/2000 | Cole et al. .............. 717/11 |
| 6,195,792 B1 | * | 2/2001 | Turnbull et al. ........... 717/5 |
| 6,199,204 B1 | * | 3/2001 | Donohue ................. 717/11 |
| 6,205,579 B1 | * | 3/2001 | Southgate ............... 717/11 |
| 6,282,709 B1 | * | 8/2001 | Reha et al. ............. 717/175 |
| 6,324,693 B1 | * | 11/2001 | Brodersen et al. ........ 717/177 |

OTHER PUBLICATIONS

Indexer Utility (software application), 1995 by Anders Lindh, screen shots and indexer.doc file, pp. 1–3.*
Nikolai I. Puntikov et al. AVCS: The APL Version Control System, 1995.*
Ram Chillarege et al. Defect Type and its Impact on the Growth Curve IEEE, 1991.*
Tim Pyron et al. Using Microsoft Project 4 for Windows, 1994.*

(List continued on next page.)

*Primary Examiner*—Joseph H. Feild
*Assistant Examiner*—William L. Bashore
(74) *Attorney, Agent, or Firm*—Thelen Reid & Priest, LLP; David B. Ritchie

(57) ABSTRACT

A method for retrieving software release information. A first step obtains a software defect data set, a second step obtains a software release data set, and a third step obtains a software release schedule data set. A fourth step relates at least two of the data sets to create an organized data set. A final step displays the contents of the organized data set thereby enabling a user to retrieve software release information.

113 Claims, 17 Drawing Sheets

OTHER PUBLICATIONS

David Lockman Teach yourself Oracle8 Database Development in 21 Days, 1997.*

David Dixson Integrated Support Project Management IEEE, 1988.*

John H. Rowland Experimental Comparsion of Three System Test Strategies Preliminary Report, ACM, 1989.*

Krumm, Rob, Access 97 Programming For Windows For Dummies, IDG Books, pp. 19, 74, 1997.*

Rushinek, S.F. et al. An evaluation and selection methodology of microcomputer training software: Implications for human resource managers and computer personnel, ACM Special Interest Group on Computer Personnel Research Annual Conference, 1988, pp. 46–49.*

LAN Based Customer Requirements Tracking Tool, IBM Technical Disclosure Bulletin, Sep. 1992, vol. 35, Issue 4A, pp. 308–309.*

* cited by examiner

SYSTEM AND METHOD FOR RETRIEVING SOFTWARE RELEASE INFORMATION

BACKGROUND OF THE INVENTION

1. Field of the Invention

The present invention relates generally to methods for obtaining information about software, and more particularly for obtaining and displaying information about software releases.

2. Discussion of Background Art

The development and maintenance of computer software is affected by a number of issues. There are an almost innumerable number of combinations of hardware, software and network environments that must be supported. Often, many of these environments are incompatible with each other. In addition, each of the environments undergoes rapid change as technology advances in their respective areas. As a result, it can be expected that a computer software product will require many changes during its life cycle.

A typical software development process has four major phases. The first is the design phase, where the operating characteristics of the software are defined. This is followed by the development phase, where programmers and engineers write the software to meet the requirements defined during the design phase. The third phase is the test phase, where the software is tested to ensure that it meets the requirements defined during the design phase, and has no major problems. The fourth phase is the release phase, where the software is provided to customers and other end users. During the development, test and release phases of the software life cycle, problems or design issues may be encountered where the software does not operate in a desirable way. These problems are often called "bugs." In addition, it is often desirable to add new features to the software as customer needs become more evident. Fixing bugs and adding features require the initiation of a new cycle of design, development, test and release phases.

It is typical in the software industry to organize releases of new software in a hierarchical manner. A major release of software is one in which significant changes have been made to the software. For example, significant new functionality may have been added or removed, or the software's user interface may have been dramatically changed. A minor release is typically one in which bugs have been fixed and improvements have been added to the software, but no major functionality has changed. In addition, there may be other releases of software that are below the level of a minor release, such as a maintenance release, an interim release, a test release or an emergency bug-fix release. These releases typically do not encompass as many bug fixes or other changes to the software. All of these releases are commonly assigned identifiers in order to distinguish them from one another. A commonly used format for identifiers is a series of numbers, separated by periods or enclosed within parentheses which identify the major and maintenance release levels for the software. For example, the identifier "11.2 (13)" may indicate major release 11.2 and maintenance release 13 within that major release.

In addition, build numbers may be used in combination with release numbers to identify software. A software build is the process of compiling and linking all of the components of a software product. Typically many different programs and modules make up a software product, and they must all be assembled into a package. A build number is essentially a sequence number assigned to the software. For example an identifier "11.2(6.1)" may indicate build 6.1 for major release 11.2 of a software product. During the development and maintenance process many reasons for building software occur. For example a maintenance build is a software build intended to be released to customers that fixes bugs that have been discovered since the last release of the software. An interim build is intended to be used by internal users to test the software before releasing it to customers or for repairing software in response to urgent customer problems. A throttle build is used for final testing of a software product before final approval, and therefore must incorporate very tight change controls. A renumber build is one that has been tested and is built again to be labeled with a new release number or identifier.

Many different parties with varying needs are acutely interested in the status of particular releases of software. Software developers need to know when the software they are working on must be ready in order to meet the deadline for a scheduled release. Customers want to know when software will be available that fixes problems they are encountering. Technical writers want to know what bug fixes and features will be included in new releases so that they can create documentation on the bug-fix or features. Product managers and customer service engineers want to know what bugs or features are included in a release so that they may accurately convey the information to current or potential customers. Each of these parties has a wide range of expertise in dealing with computers and software, varying from novice to expert.

In addition, these parties may be in very different locations. The development staff may be in one location, the maintenance staff in another, and the technical writers in yet another location. Customer service engineers and the customers may be scattered around the world.

In the past, specialized products have been developed to meet some of the individual needs of these parties. Software source code control systems have been created to allow software developers to control and identify changes to software. Additionally, software developers have benefited from software development environments which have been created to control the compiling and linking that occurs during the build process. Other systems and methods have been created to control and maintain the schedule of major and minor releases. Still other systems have been developed to report and track the history of bugs and enhancement requests. Each of these systems typically maintains their own database, each has their own user interface, and each may be centrally located and controlled.

Unfortunately, for a person to obtain complete and accurate information on a software release, he or she must have access to and knowledge of how to use the various tools that have been developed to address the individual aspects of software development issues detailed above. In addition, the user must often either have the required software on their own personal computer or be located on the same internal corporate network.

In response to these concerns, what is needed is a method for retrieving software release information that can be used in a variety of locations and environments, that can be used by novices and experts alike, and that overcomes the problems of the prior art.

SUMMARY OF THE INVENTION

The present invention provides a system and method for retrieving software release information. One component within the system of the present invention automatically gathers data from various databases and displays information on the releases containing a fix for an identified defect. A second component determines a date by which a bug must fixed if it is to be included in an identified release. A third component presents the dates of various software release events associated with a particular release. A fourth component identifies all of the software release events that are to occur within a user specified week. A fifth component automatically generates a list of defects already integrated into a particular software release.

All of the above described components dynamically generate HTML defining a web page thereby enabling the display of the software release information on displays located anywhere in the world having a network connection to a computer implementing the system and method of the present invention.

These and other aspects of the invention will be recognized by those skilled in the art upon review of the detailed description, drawings, and claims set forth below.

DETAILED DESCRIPTION OF THE PREFERRED EMBODIMENT

Figure 1:
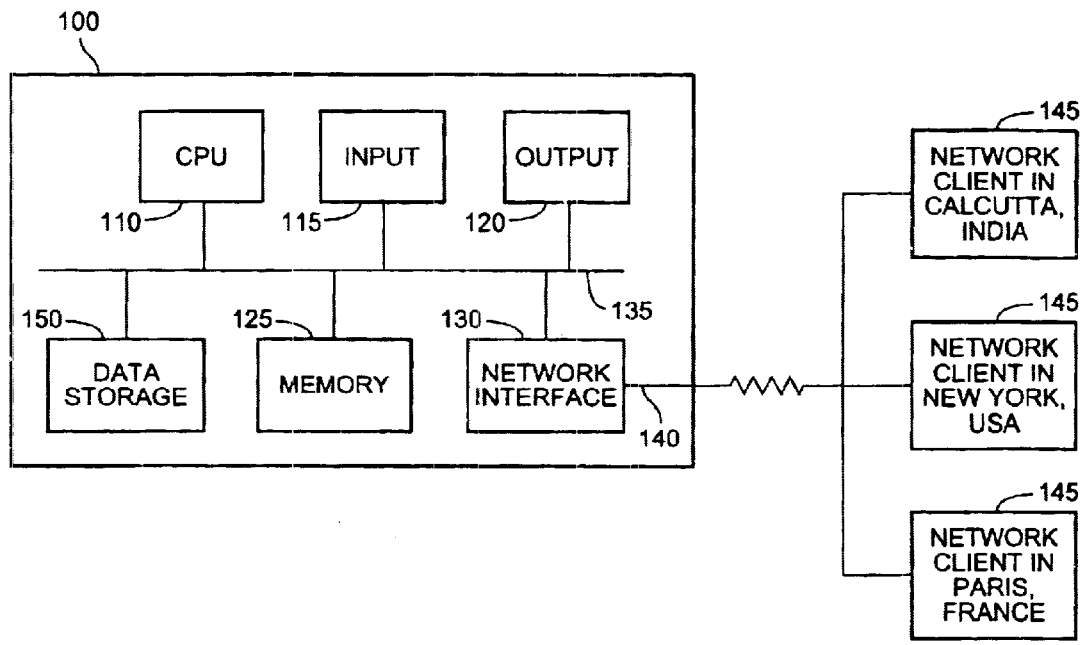
FIG. 1 is a block diagram of a computer system including a software release information system in accordance with the present invention.

FIG. 1 is a block diagram of a computer system 100, which includes one or more Central Processing Units 110, an input device 115 such as a keyboard or a mouse, an output device 120 such as a Cathode Ray Tube (CRT) display, Random Access Memory (RAM) 125, data storage 150 including Read Only Memory (ROM) and other long term storage devices such as hard disk drives, CD-ROM Drives or similar devices, and a communications interface 130, all coupled together via a signal bus 135. Data storage 150 holds the various databases associated with a software release information retrieval system. Communications interface 130 is connected to a network 140 such as a local area network, a wide area network, or the Internet. Network 140 connects computer system 100 to network clients 145. Network clients 145 comprise diskless workstations, mainframe systems, minicomputer systems, personal computers, laptop computers, palm computers or television based web browser systems. Network clients 145 can be located anywhere in the world where the network client can connect to network 140. Additionally, network 140 may connect computer system 100 to remote file and database servers containing databases used with the software release information system.

Figure 2:
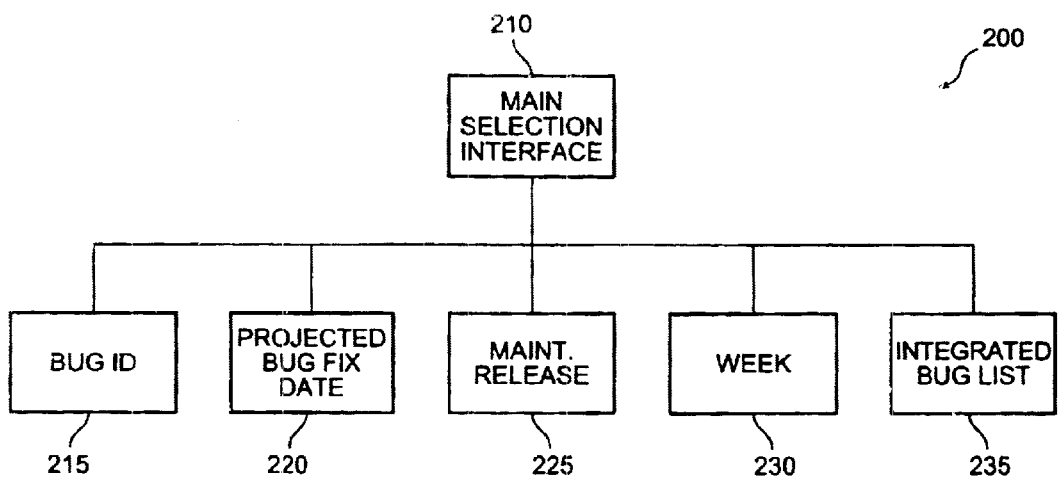
FIG. 2 is a block diagram of the software release information system.

FIG. 2 is a block diagram of the major components of a release information system 200 of the present invention. For interacting with the release information system 200 a preferred user interface is a web browser such as Netscape Navigator or Microsoft's Internet Explorer. Those skilled in the art will recognize that while the use of such browsers allows the release information system 200 to display information in a manner independent of device and hardware platform, there exist alternatives for displaying the information produced by release information system 200, which could be readily substituted. The components of the invention are implemented preferably using the Java or Perl programming languages, however other programming languages could be substituted.

In release information system 200 the first significant display output is the Main Selection Interface 210 which lists the major sub-components of system 200 and allows a user to select and invoke a desired sub-component. Preferably, the display output list of major sub-components is a list of hyperlinks which upon selection take the user to the selected sub-component interface. The present invention includes sub-component modules to present information to the user by Bug ID 215, Projected Bug Fix Date 220, Maintenance Release Identifier 225, Week 230 and Integrated Bug List 235.

Figure 3:
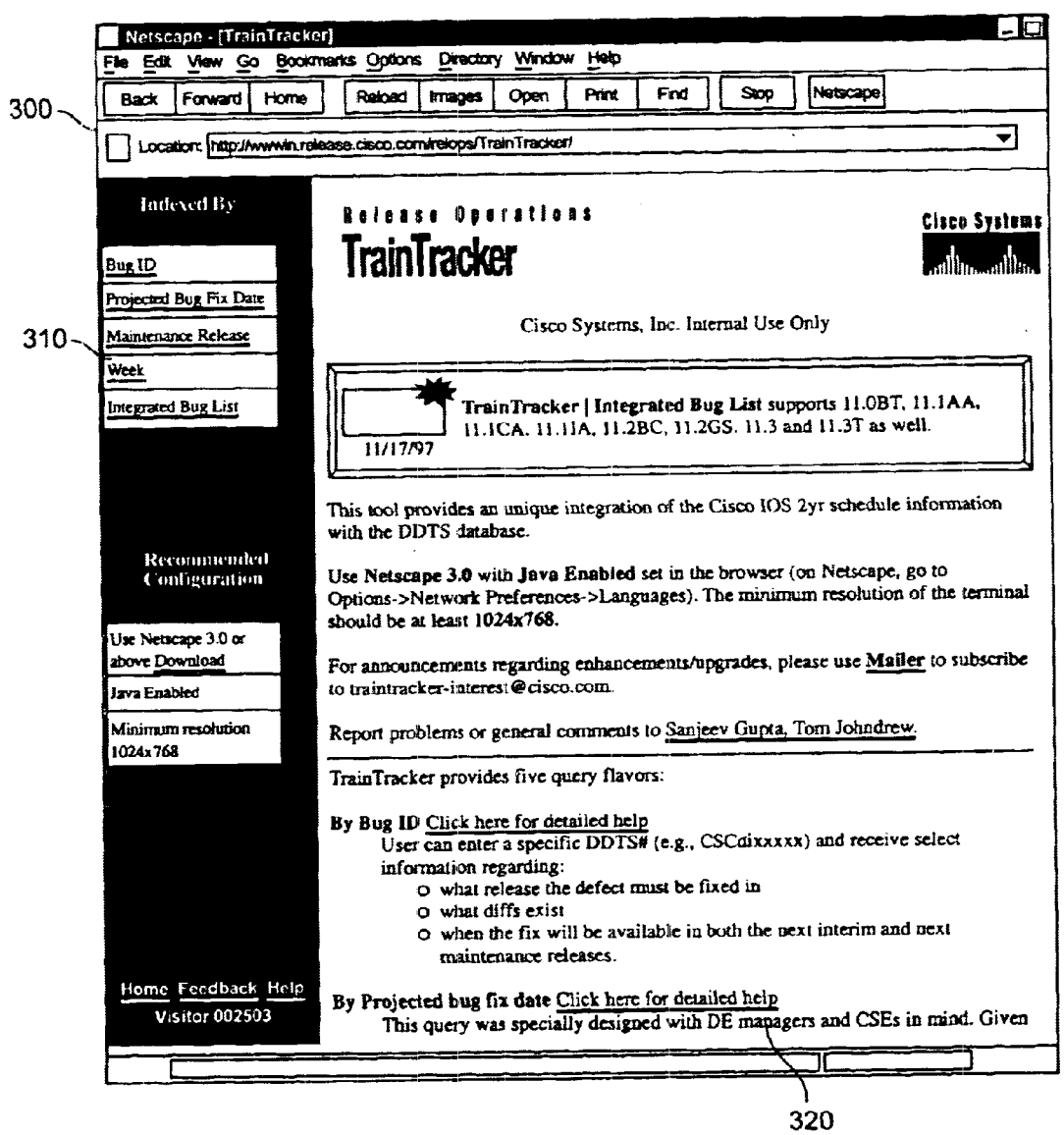
FIG. 3 is a graphical depiction of the initial display output of the preferred embodiment.

FIG. 3 shows the initial display output of the preferred embodiment. Initial screen 300 is a page of output data and is shown as it would appear when displayed using the web browser Netscape Navigator™ of Netscape Communications Corporation of Mountain View, Calif. Initial screen 300 comprises two functional areas, a query component selection index 310 and a text region 320. Query component selection index 310 is preferably implemented as a list of hyperlinks, with each entry of the list representing one of the major components detailed with reference to FIG. 2. A user may select a query component by moving a mouse to position a cursor over the desired hyperlink and clicking a mouse button. Some query components when selected may present an expanded list of additional selectable items. In the preferred embodiment, text region 320 displays descriptive text and images about the present invention, and a selection interface to obtain further information about the system.

Figure 4:
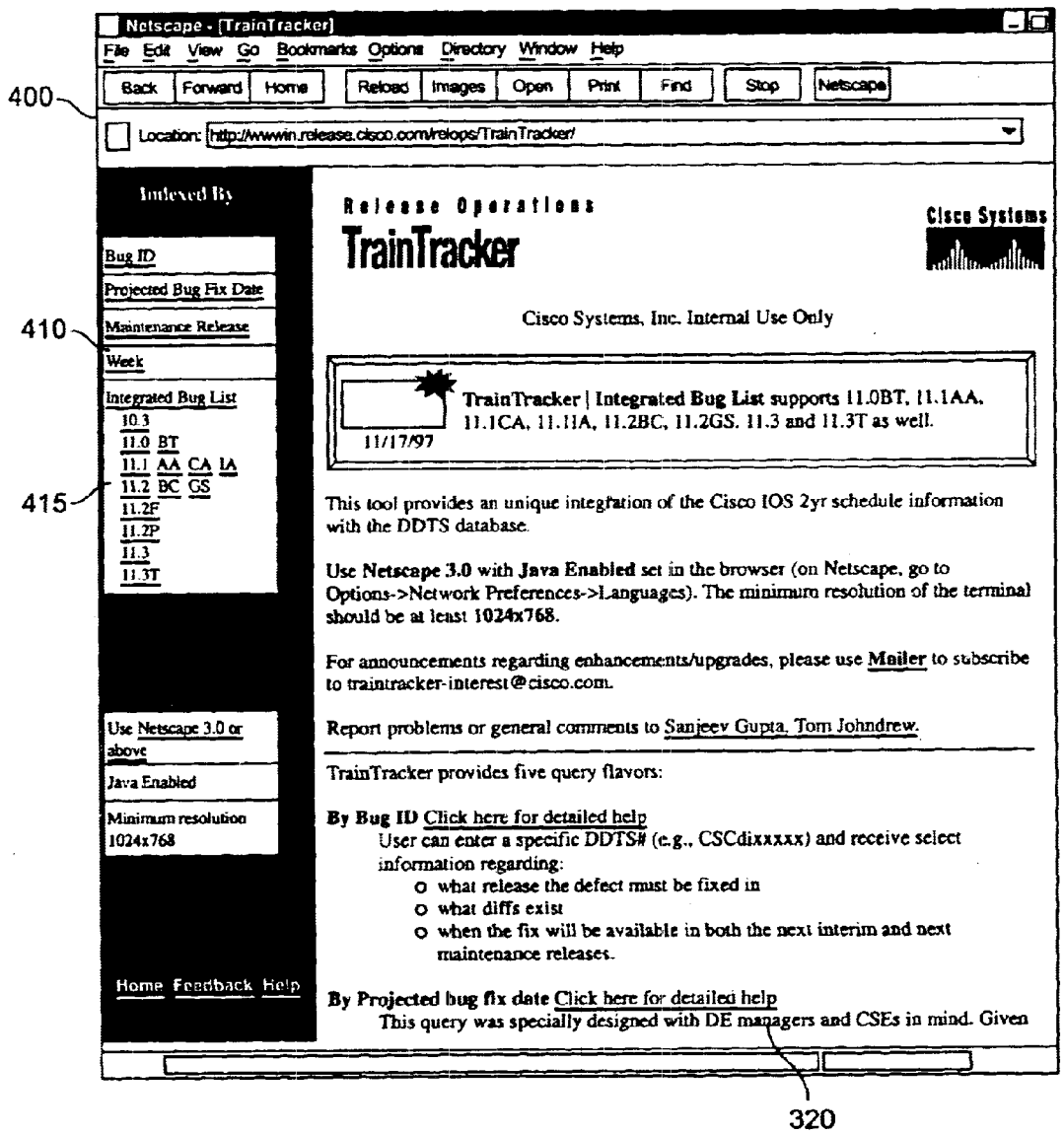
FIG. 4 is a graphical depiction of the display output after the "Integrated Bug List" link in FIG. 3 has been selected.

FIG. 4 shows the display output after the "Integrated Bug List" link has been selected from query component selection index 310 of FIG. 3. Screen 400, similarly to screen 300, comprises text region 320 and an expanded query selection index 410 which includes the additional information of a list of selectable major release identifiers 415.

Figure 5:
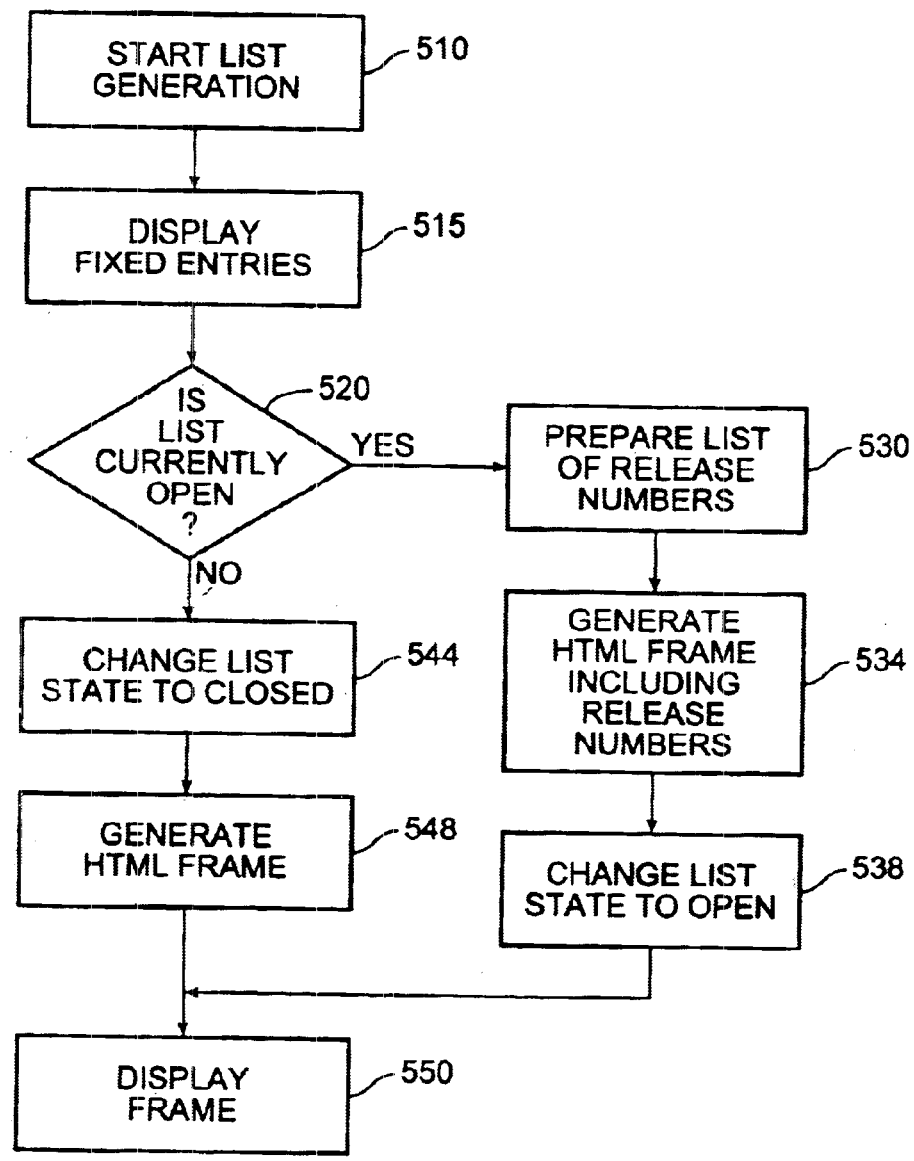
FIG. 5 is a flowchart describing the transition from the display output in FIG. 3 to the display output in FIG. 4.

FIG. 5 is a flowchart describing the steps involved in the transition from the display output in FIG. 3 to the display output in FIG. 4 and back again. (The method is implemented by conventionally available computer equipment shown in FIG. 1.) This method is initiated when the user selects the "Integrated Bug List" link from query component selection index 310 in FIG. 3 or 410 in FIG. 4. The method begins in step 510, with the initialization of conventional data structures. Next, step 515 creates a list of entries common to the display output in FIG. 3 and FIG. 4. In the preferred embodiment, this list comprises hyperlink entries titled "Bug ID," "Projected Bug Fix Date," "Maintenance Release," "Week" and "Integrated Bug List." Next, in step 520, the method checks a list state variable to see if the list of selectable major release identifiers is currently being displayed (open, as in FIG. 4) or not (closed, as in FIG. 3).

If the list state variable is not currently open, the method proceeds to step 544 and changes the list state variable to closed. Next, in step 548, a hypertext markup language (HTML) from a list generated to display the list to the user. Those skilled in the art will recognize that alternative methods to HTML are available to generate a screen to be displayed to a user.

If the list state variable is currently set to closed, the method proceeds to step 530 and queries a database to determine a list of currently active release identifiers. The database is comprised of preferably a computer file system directory structure in which directory names indicate releases. Alternative databases such as a file, spreadsheet, relational database management system or object oriented database could be substituted. Next, step 534 generates an HTML frame containing the currently active release from step 530 and the fixed list entries from step 515. Next, in step 538, the list state variable is changed to open to reflect the current list state.

In the final step 550 the HTML frame just generated is displayed to the user. This step will display the page in FIG. 3 if the list state variable is closed or the page in FIG. 4 if the list state variable is open.

Figure 6:
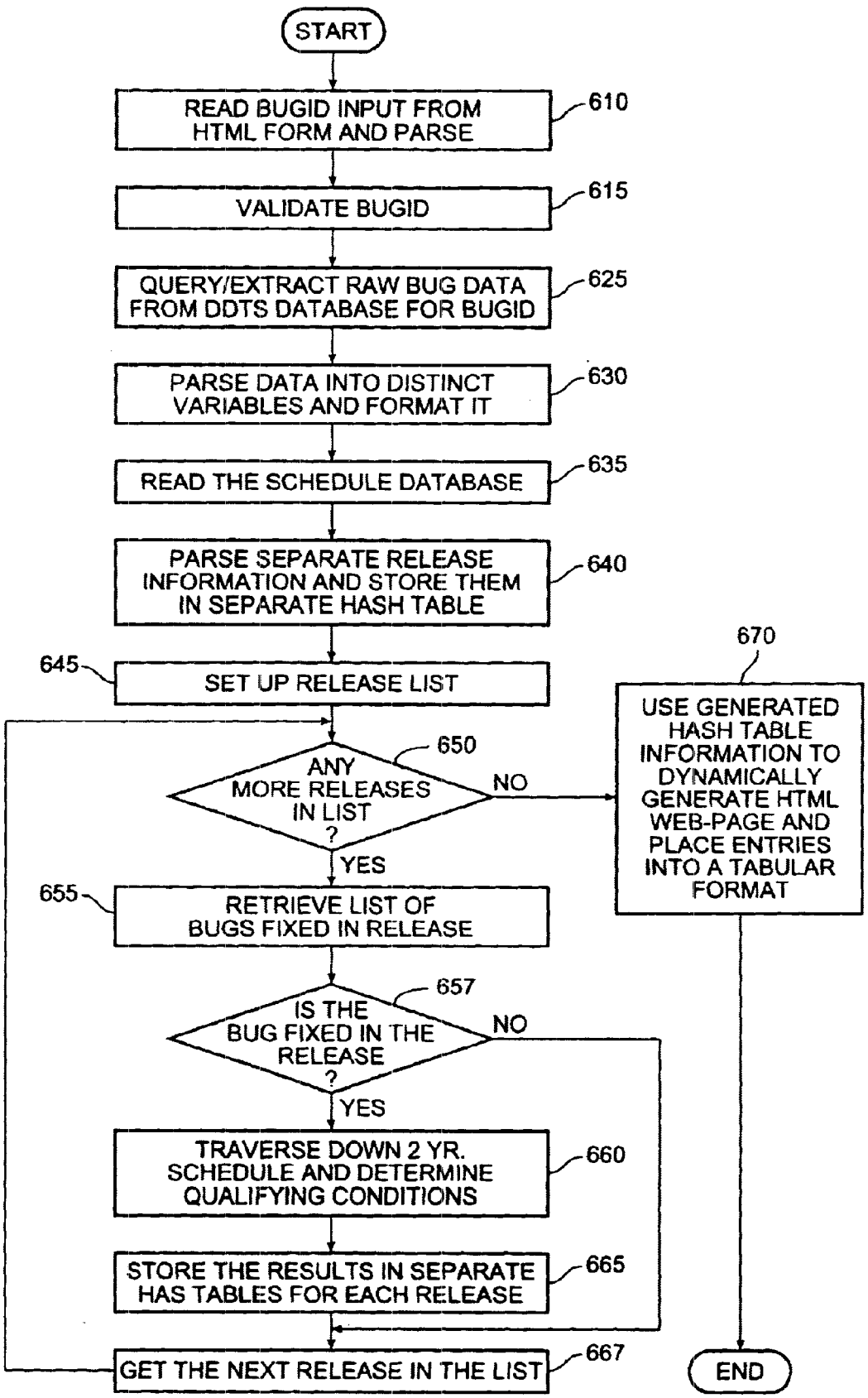
FIG. 6 is a flowchart for collecting data based on Bug ID.

FIG. 6 is a flowchart for collecting data based on Bug ID and further describes component 210 of FIG. 2. The method begins in step 610, where the user inputs a bug identifier preferably read from an entry on an HTML form or selected from a list of available bug identifiers, entered onto a database form, etc. Next, in step 615, the bug identifier is compared to a list of valid bug identifiers. If the bug identifier is invalid, no further processing will take place and the user will be allowed to enter an alternative bug identifier. The method proceeds to step 625 where data regarding an identified bug is read from a database containing information about software bugs. Next, in step 630, a subset of the data returned in step 625 is stored into data structures describing the bug. This data structure is preferably a hash table, with the bug identifier used as a hash key. Alternatives such as an array or linked list could be substituted. Next, in step 635, a schedule for software releases is read from a software release database. The release schedule database is preferably a tab-delimited file containing a two year span of schedule information. Alternative database mechanisms could be substituted and other time span lengths could be chosen as necessary. The method proceeds to step 640 where relevant data about each release are stored in a data structure describing the software release. This data structure is preferably also a hash table with the release identifier used as a hash key. Next, step 645 builds a data structure representing a list of releases.

Step 650 in FIG. 6 begins a loop that iterates over each release in the list of releases by checking whether any releases remain in the list. If a release is in the list, the method proceeds to step 655 which retrieves from the release database a list of bugs fixed in each release. In addition, this step adds to the list those bugs that have been committed to be fixed in the release, but have not yet been fixed. Next, step 657 checks whether the current bug identifier is included in the list of bugs actually fixed or committed to be fixed for the release. If not, the method proceeds to step 667. If the list of bugs includes the current bug identifier, then step 660 retrieves the schedule information for the release. Next, in step 665, the schedule information from step 660 is stored in a data structure, preferably a hash table, describing the release schedule. Step 667 retrieves the next release in the list. The method then returns to the top of the loop and step 650.

Figure 7:
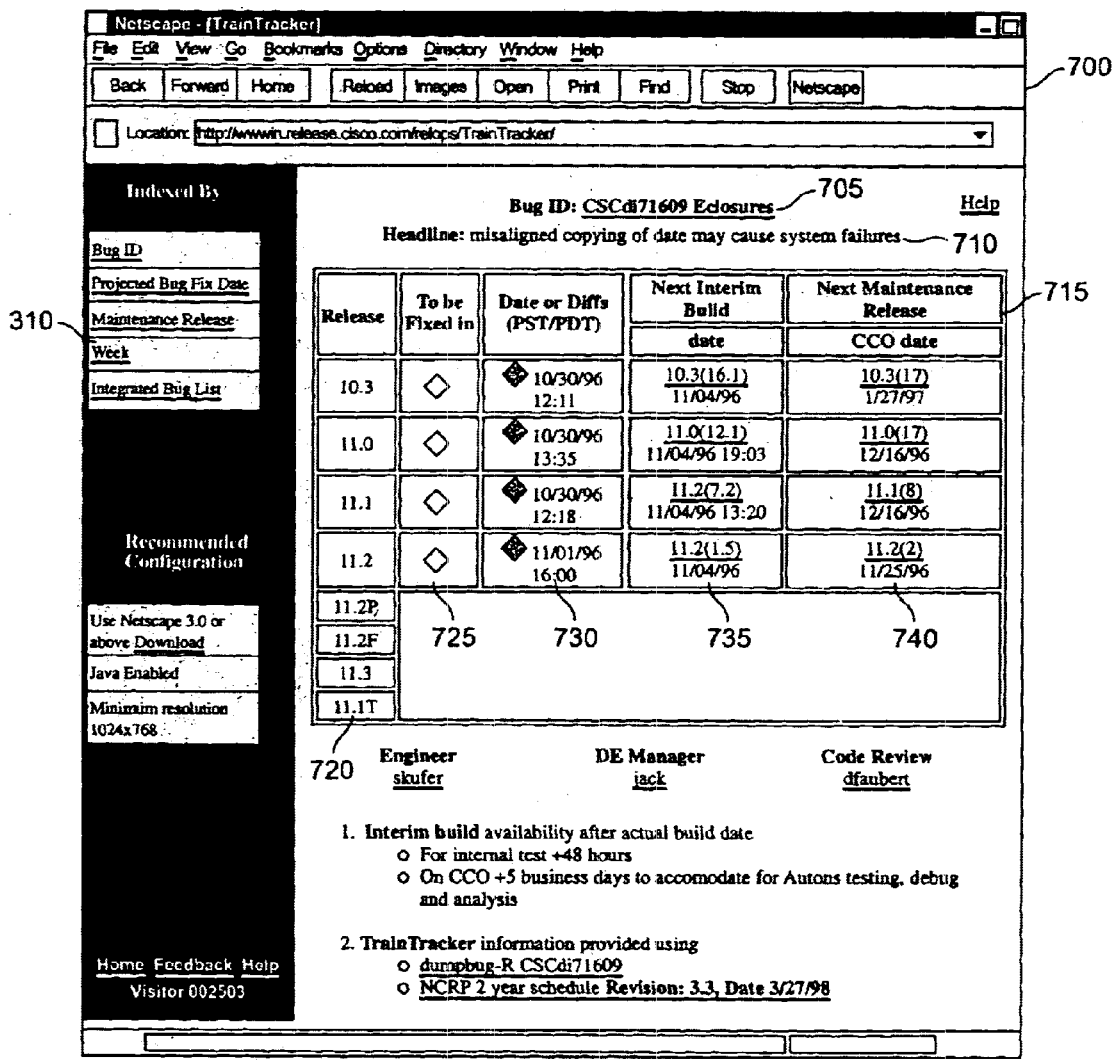
FIG. 7 is a graphical depiction of a display output of the data collection produced using the process of FIG. 6.

When no release remains in the list, step 650 directs the method to step 670 in which the information from the data structures describing the bug, and the information in the data structures describing the software release is used to dynamically generate HTML that produces the web page shown in FIG. 7. One could substitute other methods of output such as a database form or a PDF file designed to be used by the Adobe Acrobat® Reader from Adobe Systems Incorporated of San Jose, Calif.

FIG. 7 shows the data collected by the process of FIG. 6. Bug ID screen 700 includes the query component selection index 310, a bug identifier header 705, a bug headline 710 and a release table 715. Bug identifier header 705 gives the bug identifier associated with the information on the screen ("CSCdi71609" in FIG. 7). Bug headline 710 contains a short one line description of the bug. Release table 715 has rows describing a particular release and columns containing a data element describing an aspect of the release. Data for each column are obtained from the data structures describing the bug, the software release and the release schedule. Column 720 identifies the release. Column 725 indicates the status of the bug with regard to the release, preferably using a colored diamond. A red diamond indicates that the bug is scheduled to be fixed in the release identified in column 720, but no further information is available on the status of the bug. A green diamond indicates that the bug has been fixed and the software will be integrated into the release identified in column 720. A cyan diamond indicates that the bug has been fixed, even though it was not scheduled or committed for the release identified in column 720. A gold diamond indicates that the bug is scheduled to be fixed in the release identified in column 720. A magenta diamond indicates that a fix for the release has been approved for inclusion into the release identified in column 720. Column 730 contains the date and time that software fixing the bug was implemented in the release. Column 735 contains the date that an interim build of the release either took place or will take place. Column 740 contains the date that a maintenance release either was released or will be released to customers.

Figure 8:
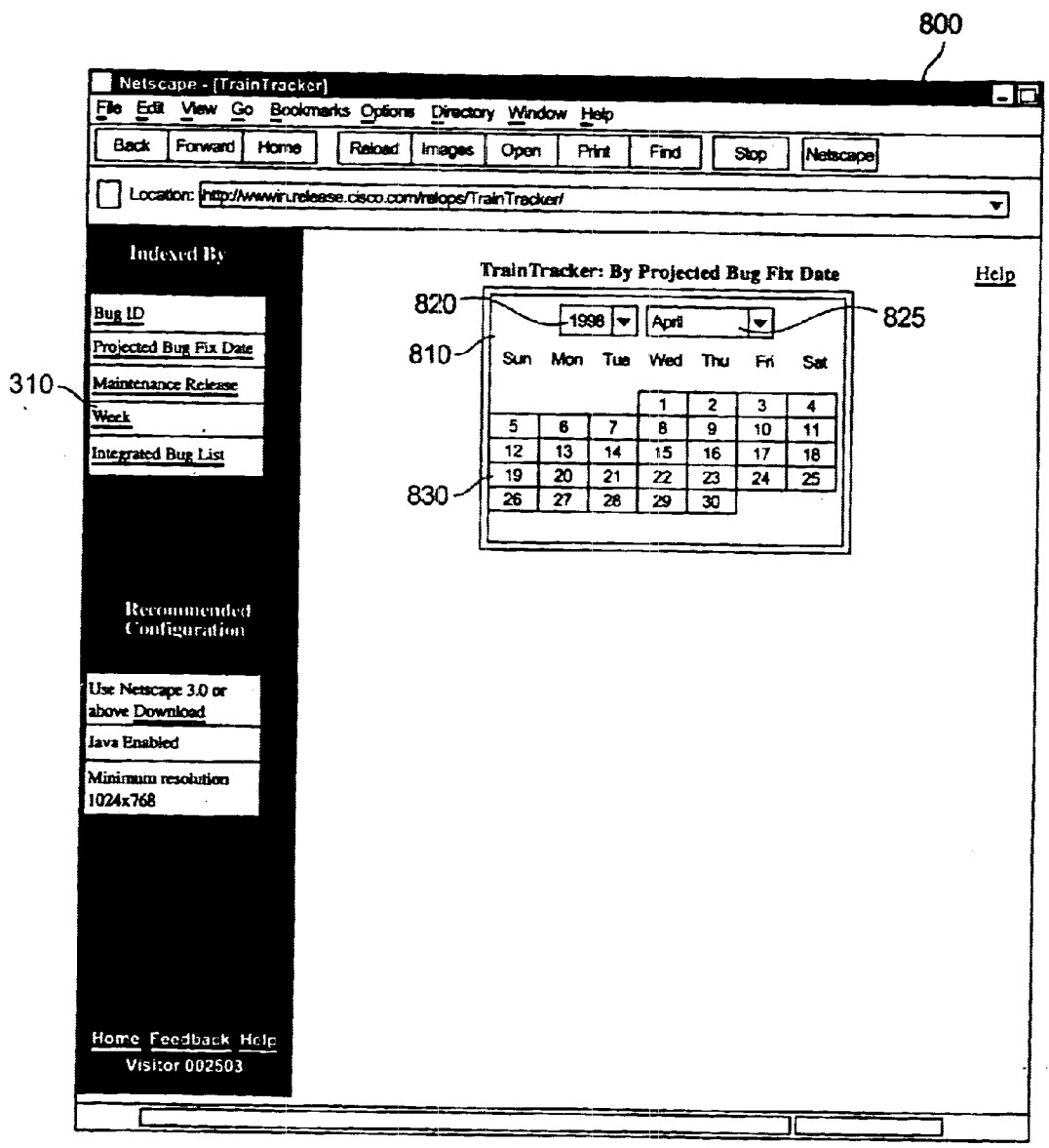
FIG. 8 is graphical depiction of a display output allowing a user to select a particular Projected Bug Fix Date.

FIG. 8 shows the initial screen of component 220 of FIG. 2, a display output allowing a user to select a particular Projected Bug Fix Date. Input to this component is a date by which a fix for a bug is expected to be implemented. Screen 800 comprises the query component selection index 310 and a calendar 810 that contains a year drop down box 820 and a month drop down box 825, which, when selected, present a list of years and months within a year. The calendar also contains a day button 830 for each day of the selected month and year. A user selects a particular date by choosing a year and month from drop down boxes 820 and 825, and by pressing the day button for the desired day. The selected date is then input to the method described in FIG. 9.

Figure 9:
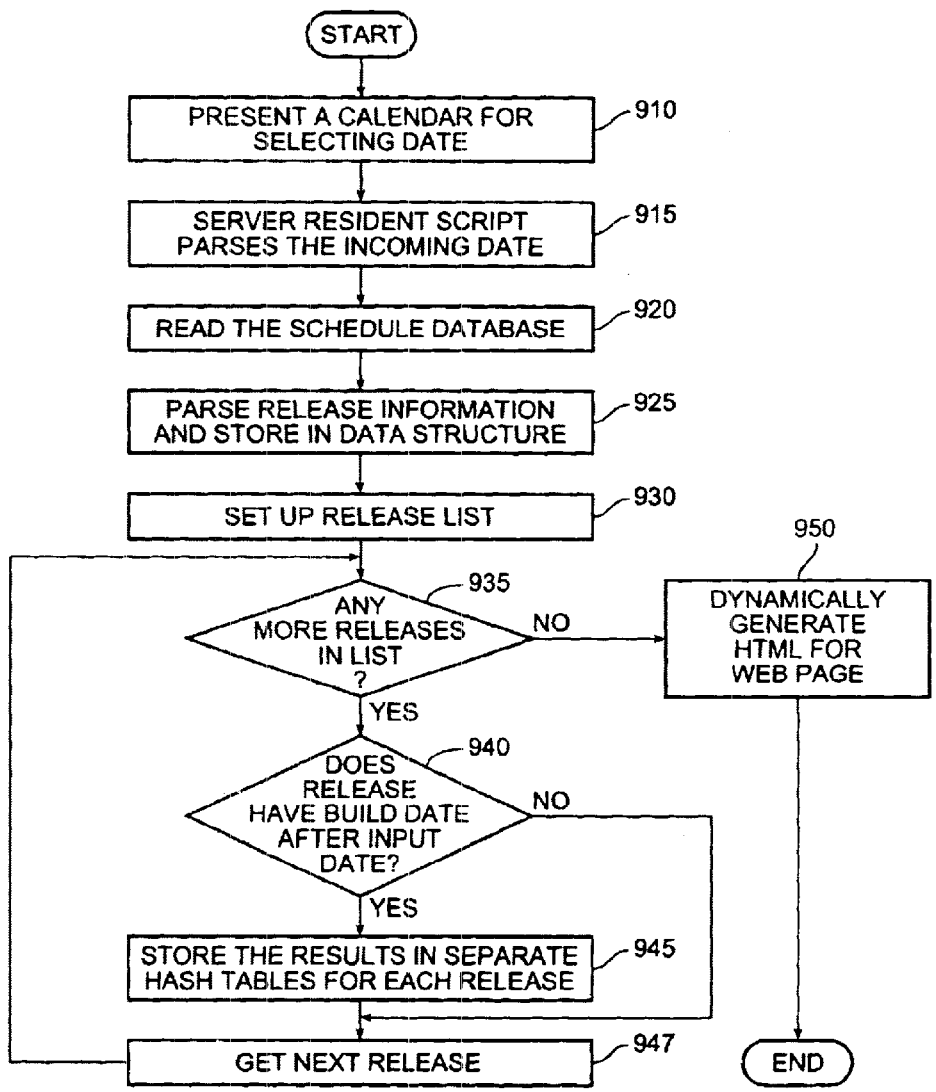
FIG. 9 is a flowchart for collecting data based on a Projected Bug Fix Date.

FIG. 9 is a flowchart for collecting data based on a Projected Bug Fix Date as done by component 220 of FIG. 2. The method starts with step 910 where the calendar based input screen of FIG. 8 is presented to the user. Next, in step 915, the system parses the date selected by the user. Step 920 reads from the software release database the schedule for software releases. Step 925 stores relevant data about each release in the data structure describing the software release. Step 930 builds a list of software releases.

Step 935 begins a loop that iterates over each software release in the list built in step 930. Step 935 determines if unprocessed releases remain in the list. If at least one release remains then step 940 examines each data structure describing the software release to determine if the software release has a build date later than the date input in step 910. If the software release does have a later date, then step 945 retrieves relevant data from the software release data structure and stores them in a release display data structure, preferably a hash table. The following step 947 obtains the next release, if any, in the list.

Figure 10:
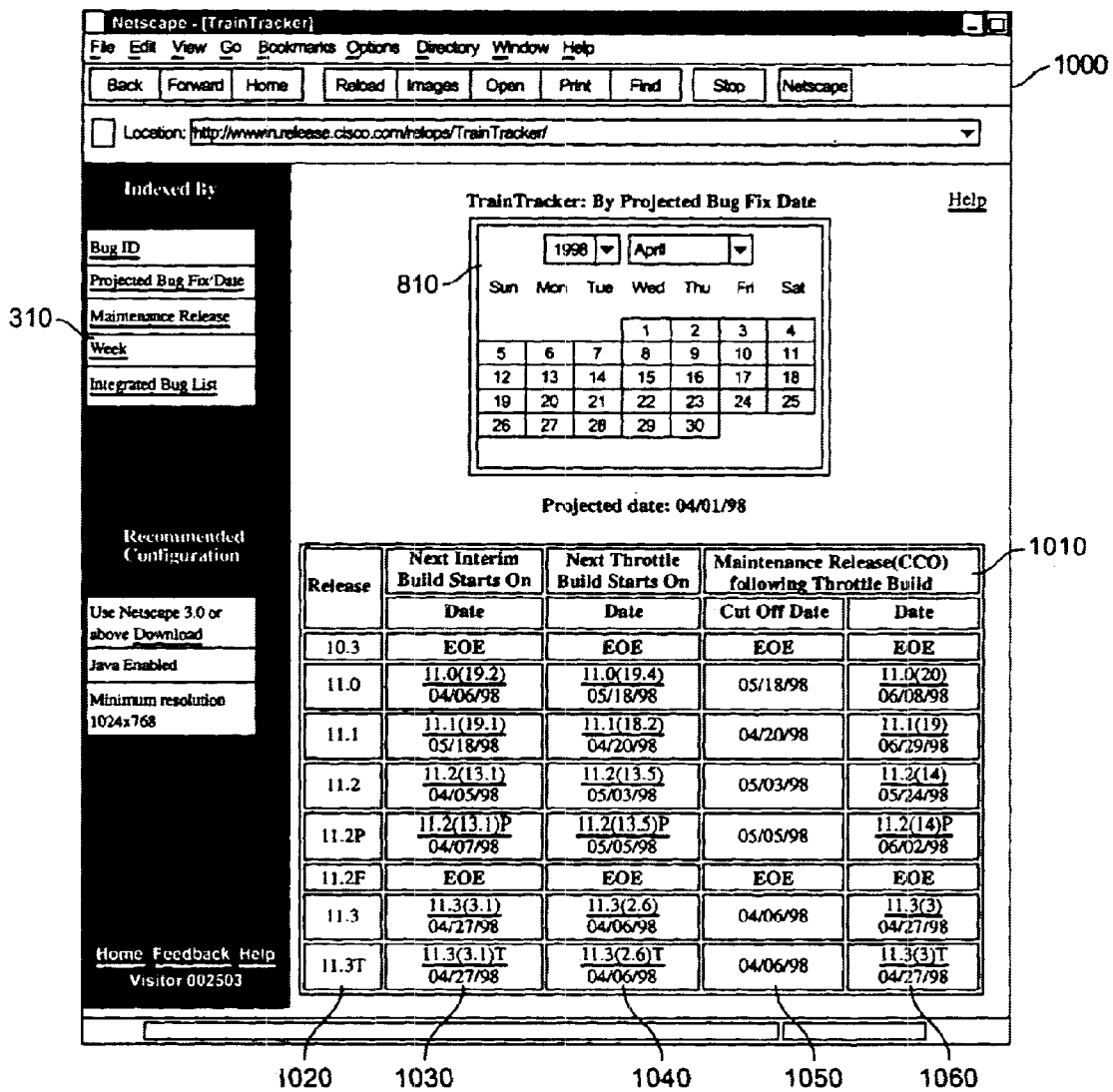
FIG. 10 is a graphical depiction of a display output of the data collection produced using the process of FIG. 9.

When all software releases in the list have been processed, step 935 directs the method to step 950, which uses the release display data structure to dynamically generate HTML for a web page displaying a table of software release data similar to the table of FIG. 10.

FIG. 10 shows a display of the data collected by the process of FIG. 9. Screen 1000 includes the query component selection index 310, calendar 810, and a release schedule table 1010 with each row representing an individual release and each column containing a data item describing the release. Column 1020 contains an identifying label that uniquely identifies a release. Column 1030 contains the date on which the next interim build will take place. Column 1040 contains the date on which the next throttle build will take place. Column 1050 contains the date by which software fixing the bug must be implemented in order to be included in the maintenance release build. Column 1060 contains the maintenance release date when the software release will be generally available to customers and others outside of the engineering organization.

Figure 11:
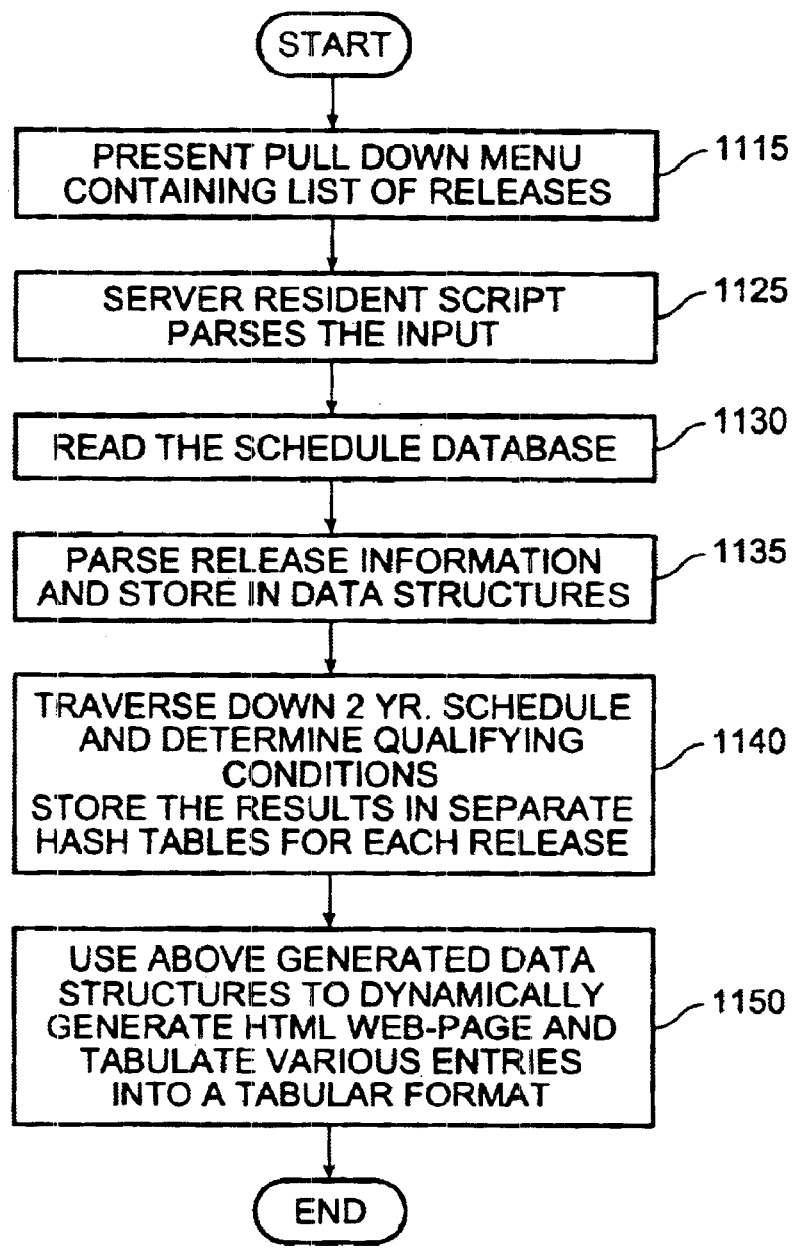
FIG. 11 is a flowchart for collecting data based on a Maintenance Release Identifier.

FIG. 11 is a flowchart for collecting data based on a Maintenance Release Identifier as done by component 225 of FIG. 2. First step 1115 preferably presents to the user a drop down box containing a list of major release identifiers, from which the user selects a major release identifier. Step 1125 parses the user's input into an input data structure. Step 1130 reads from the software release database the schedule for software releases. Next, step 1135 stores relevant data about each release in the data structure describing the software release. Step 1140 then examines each data structure describing the software release looking for a match based on the major release identifier. Each time a match is found, relevant data are taken from the data structure describing the software release and placed in a schedule display data structure, preferably a hash table. The method concludes in step 1150 where the schedule display data structure is used to dynamically generate HTML for displaying a web page containing a data collection from the release schedule database.

Figure 12:
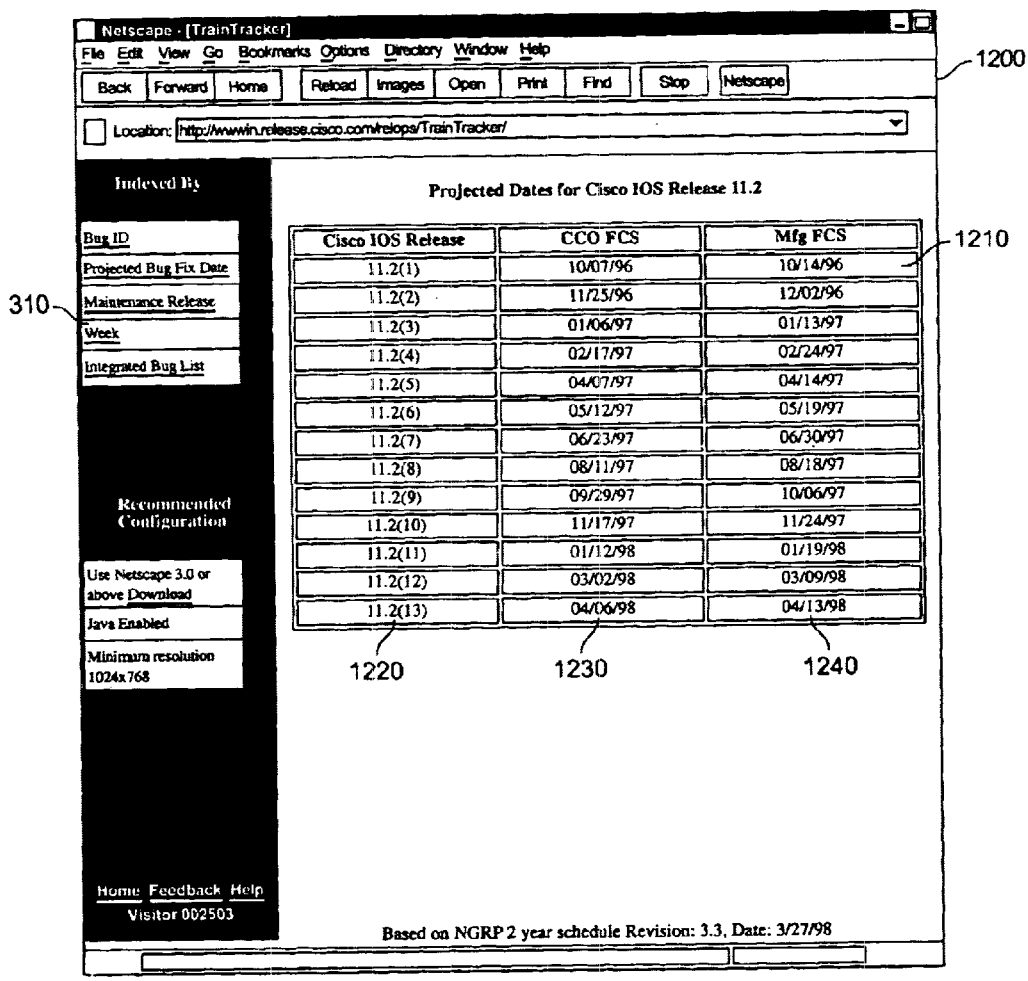
FIG. 12 is a graphical depiction of a display output of the data collection produced using the process of FIG. 11.

FIG. 12 shows a display of the data collected by the process of FIG. 11. Schedule display screen 1200 includes the query component selection index 310 and a schedule table 1210 with each row representing a maintenance release within the major release identified by the release identifier obtained in step 1115 of FIG. 11. Column 1220 contains the label identifying the maintenance release. Column 1230 contains the date when the release was or will be first available for downloading to customers. Column 1240 contains the date when the release will be first included with hardware or distribution media produced during the manufacturing process for shipment to customers.

Figure 13:
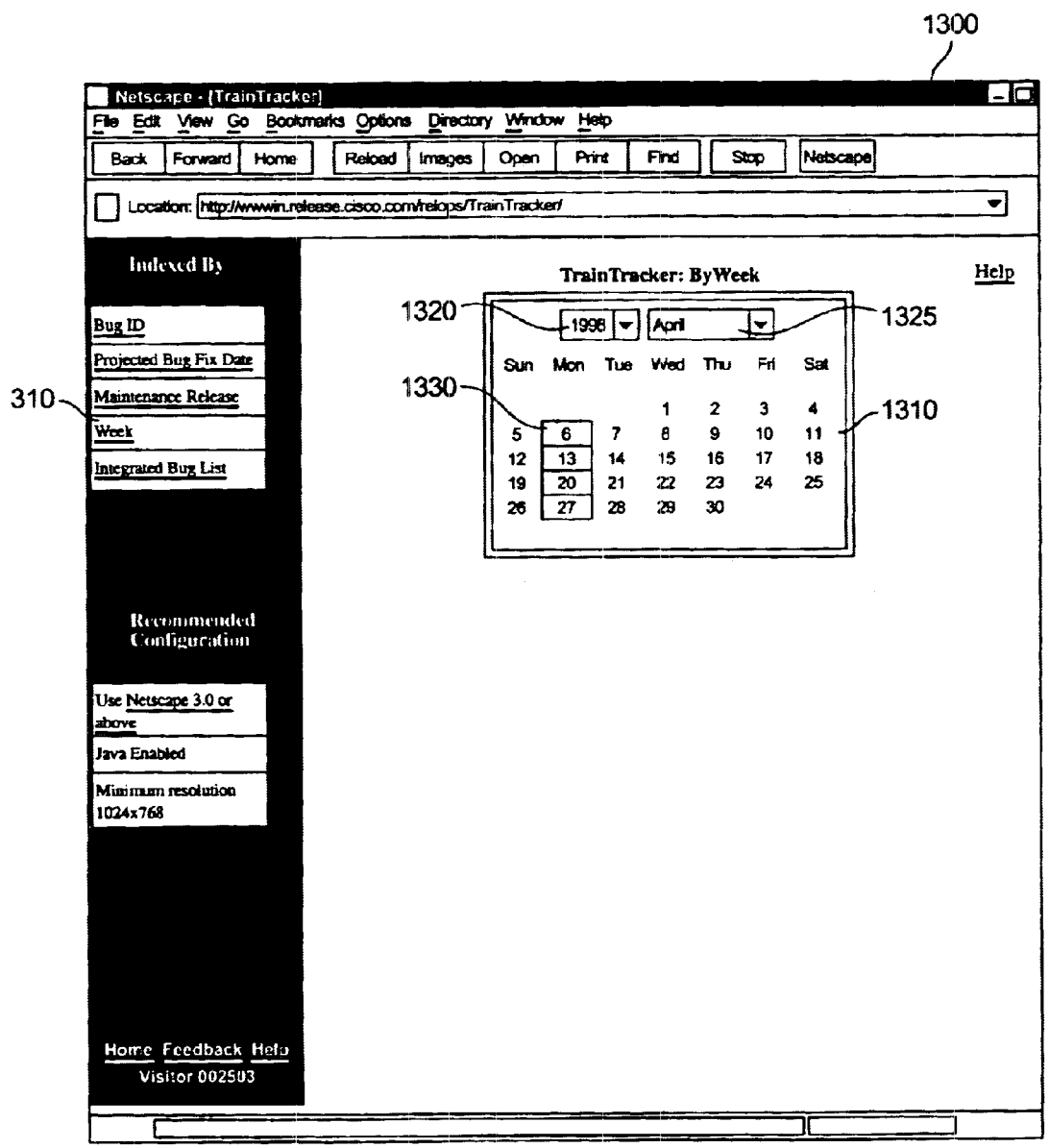
FIG. 13 is graphical depiction of a display output allowing a user to select a particular week of a year.

FIG. 13 shows the initial screen 1300 of component Week 230 of FIG. 2, a display which allows a user to select a particular week of a year. Input to this component is a date corresponding to a week for which the user desires to obtain release information. Screen 1300 preferably comprises the query component selection index 310, and a weekly calendar 1310 which contains a year drop down box 1320 and a month drop down box 1325 which, when selected, present a list of years and months within a year. The calendar also contains one day button 1330 for each Monday in the selected month. A user selects a particular week by choosing a year and month from drop down boxes 1320 and 1325, and by pressing the day button for the Monday of the desired week. The selected date is then input to the method described in FIG. 14.

Figure 14:
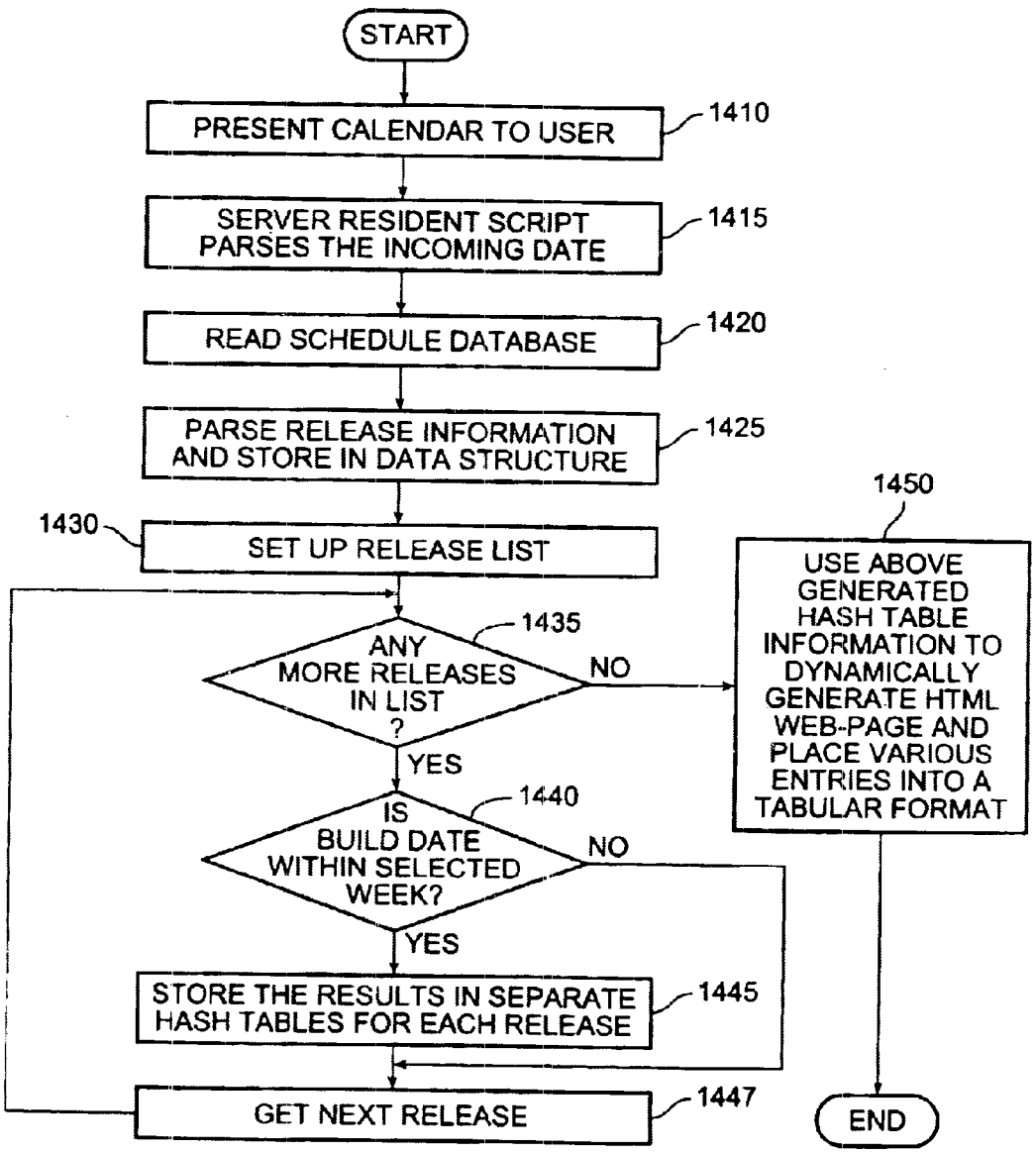
FIG. 14 is a flowchart for collecting data based on an input of a particular week of a year.

FIG. 14 is a flowchart for collecting data based on an input of a particular week as done by Week 230 component of FIG. 2. First, step 1410 presents to the user a calendar based input screen of FIG. 13 similar to the calendar described with reference to FIG. 9 but only allowing selection of Mondays. Next, in step 1415, the system parses the date selected by the user. Step 1420 reads from the software release database the schedule for software releases. Next, step 1425 stores relevant data about each software release in the data structure describing the software release. Step 1430 builds a list of software releases.

Step 1435 of FIG. 14 begins a loop that iterates over each software release in the list built in step 1430 by determining if any unprocessed releases remain in the list. If at least one release remains in the list, then step 1440 examines each data structure describing the software release to determine if the software release has a build date during the week starting on the Monday input in step 1410. If the software release does not have such a date, the method proceeds to step 1447. If it does then step 1445 retrieves relevant data from the software release data structure and stores it in a release display data structure, preferably a hash table. Next, step 1447 obtains the next release, if any, in the list.

Figure 15:
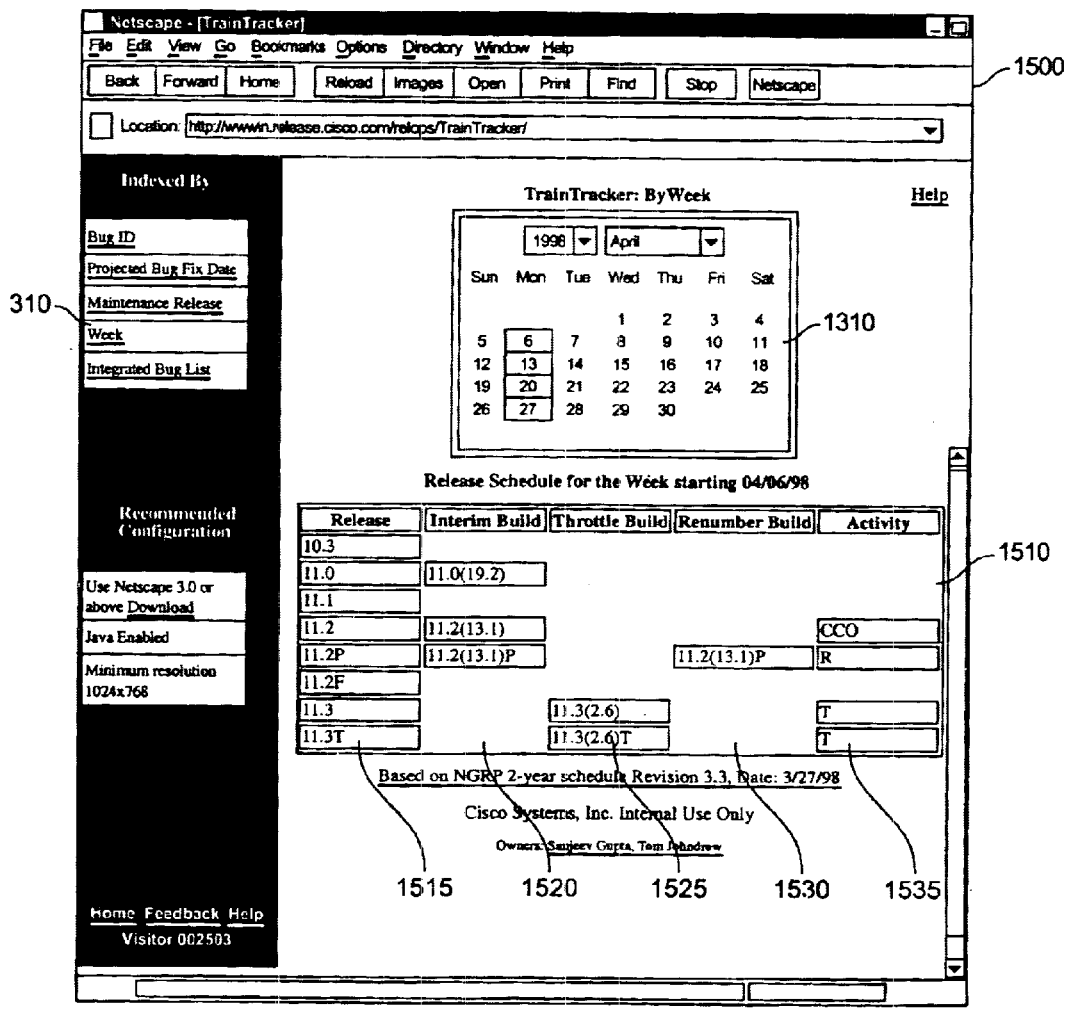
FIG. 15 is a graphical depiction of a display output showing the data collection produced using the process described in FIG. 14.

When all software releases in the list have been processed, step 1435 directs the method to step 1450 which uses the release display data structure dynamically to generate HTML for a web page that displays a table of software release data like FIG. 15.

FIG. 15 shows a display of the data collected by the process of FIG. 14. Screen 1500 includes the query component selection index 310, calendar 1310, and a weekly release schedule table 1510 with each row representing an individual release and each column containing a data item describing the release. Columns 1520, 1525 and 1530 may contain dates either in the past or the future depending on the date input by the user. Column 1515 contains an identifying label that uniquely identifies a release. Column 1520 contains a scheduled date for the interim build. If no interim build is scheduled for the specified week, column 1520 will be blank. If the user specifies a past date, the date in column 1520 will show the date that the interim build occurred. If the user specifies a future date, column 1520 will show the date the interim build is currently scheduled to occur. Column 1525 contains a date scheduled for a throttle build. Like column 1520, if no throttle build is scheduled for the specified week, the column entry will be blank. If the date in column 1525 is in the past, it represents the date within the week specified by the user that the throttle build occurred. Otherwise, the date in column 1525 represents the date within the specified week that the throttle build is to occur. Column 1530 contains a date scheduled for a renumber build, which, if no renumber build is scheduled for the specified week, will be a blank entry. If the date in column 1530 is in the past, it represents the date within the specified week that the renumber build occurred. Otherwise, the date in column 1530 represents the date within the specified week that the renumber build is to occur.

Figure 16:
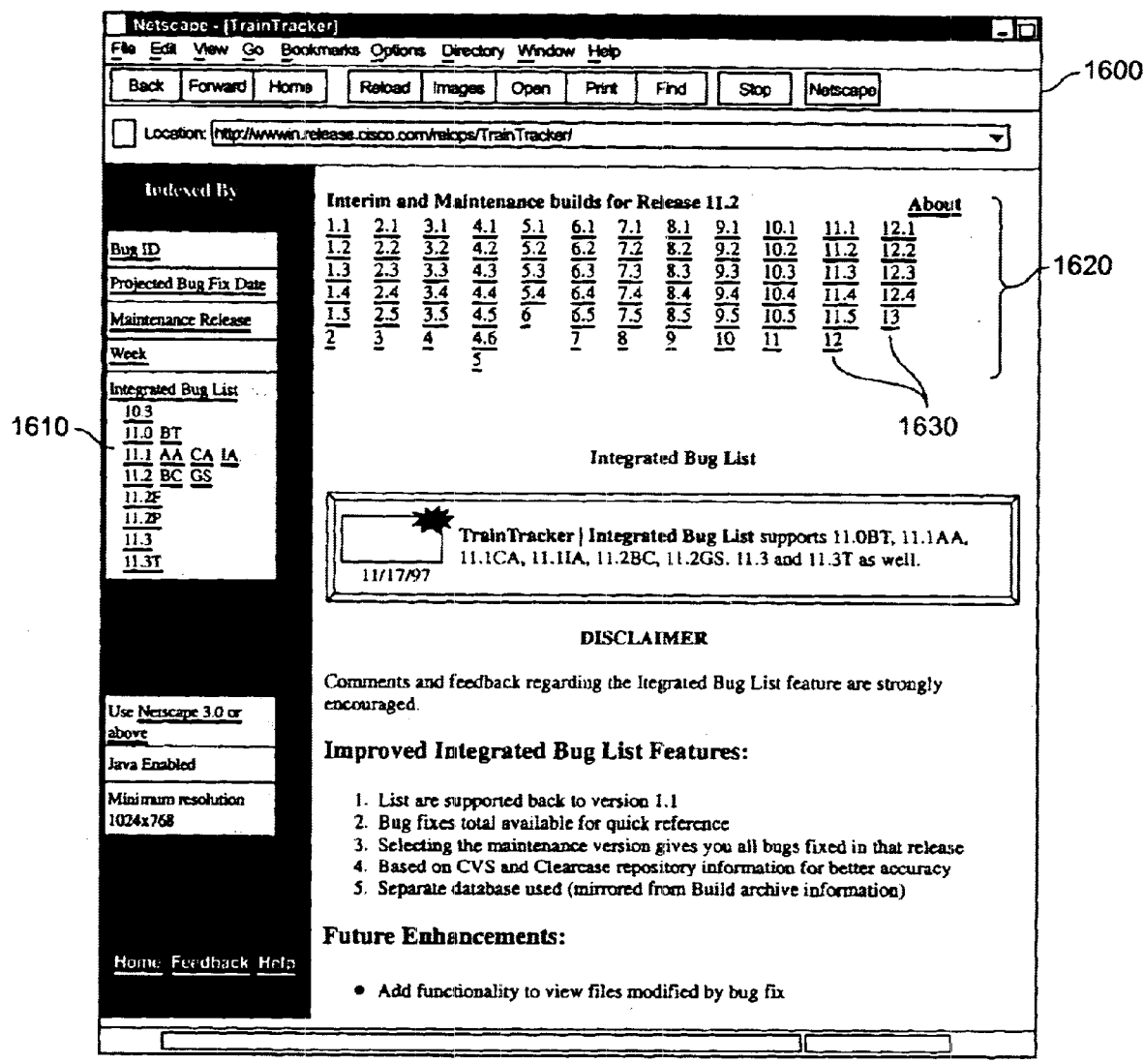
FIG. 16 is a graphical depiction of a display output for allowing the selection of a particular release identifier.

FIG. 16 shows the initial screen of FIG. 2 component 235, a release selection screen 1600 for allowing the selection of a particular release number. Screen 1600 comprises the release query component selection index 1610 as expanded by the method described with reference to FIG. 5, and interim build table 1620. Release query component selection index 1610 contains a list of major release identifiers. After the user selects one of the major release identifiers, the system displays an interim build table 1620 organized left to right by columns 1630. Each column represents a time series of interim build identifiers within the major release selected by the user. The bottom entry in each column represents a maintenance release identifier. Each entry in a column is preferably a selectable hyperlink that, when selected, presents information to the user about the bugs fixed in that release.

Figure 17:
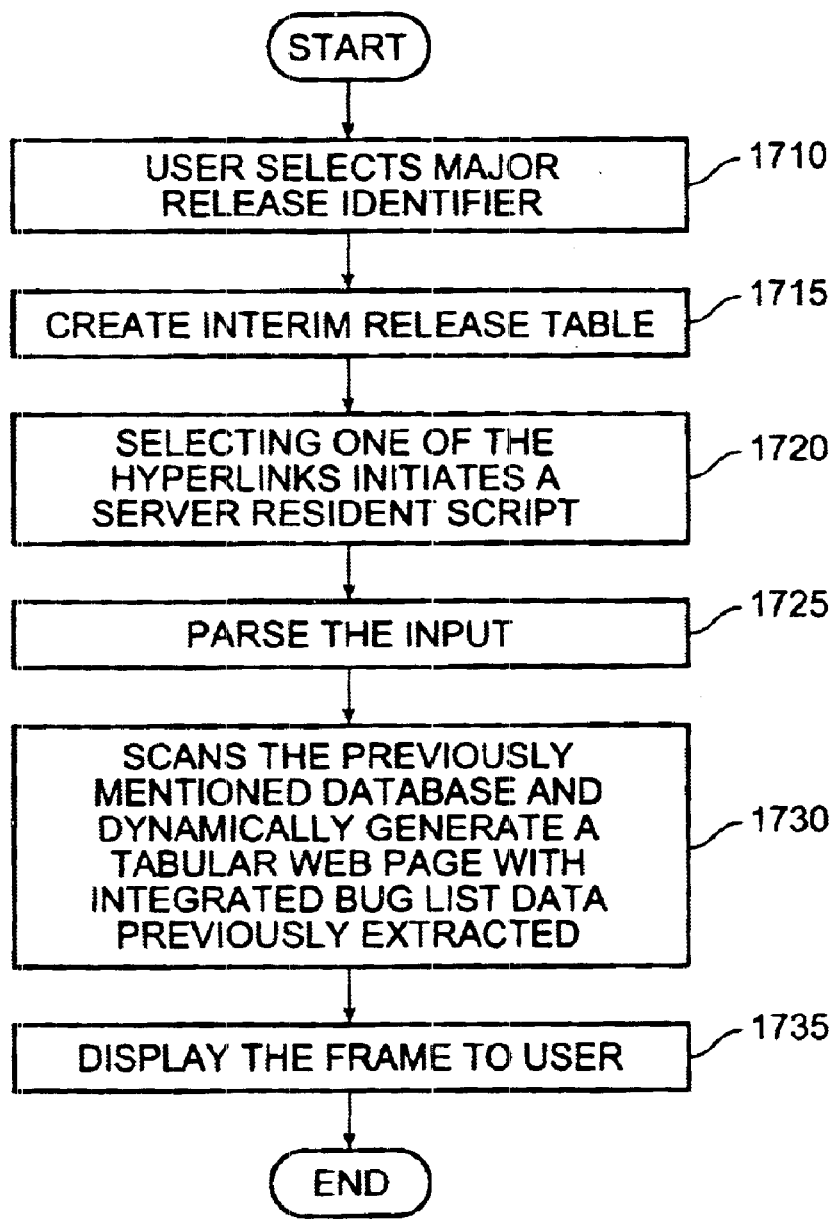
FIG. 17 is a flowchart for gathering a data collection based on the selection of a particular release identifier.

FIG. 17 is a flowchart for collecting data based on the selection of a particular release identifier as done by FIG. 2 Integrated Bug List 235. The method starts with step 1710 when a user selects a major release identifier from the list of available major releases. Next, step 1715 uses HTML to dynamically generate an interim build table 1620 (FIG. 16) and displays it to the user. In step 1720, the user selects one of the entries representing a particular release in the interim build table, which causes step 1725 to parse the selection. Next, step 1730 uses the input from the selection in step 1725 as a key to query a release information database and find related information about the release. Finally, step 1735 uses HTML to dynamically generate a table of a selected subset of the information returned by the query, and displays a web page.

Figure 18:
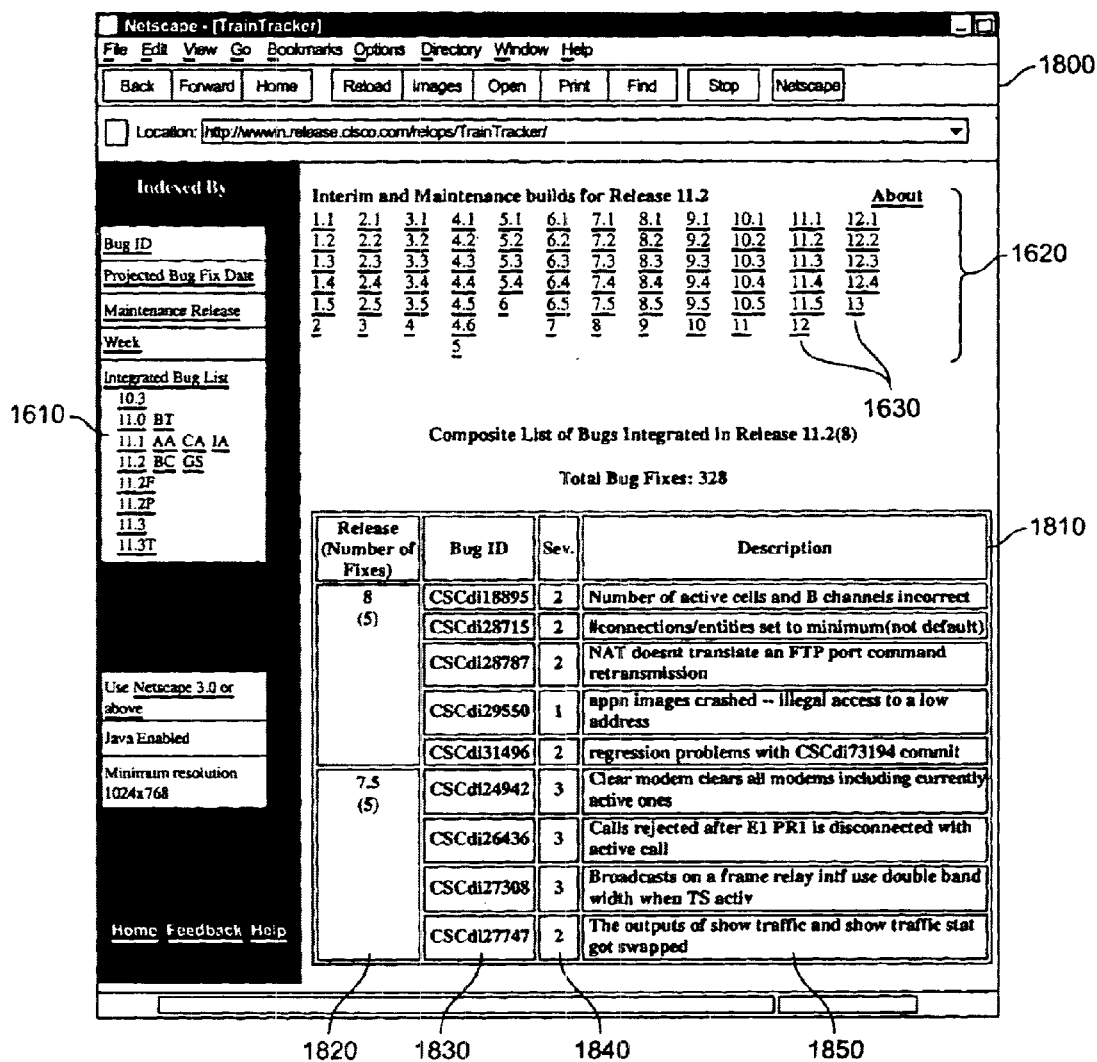
FIG. 18 is a graphical depiction if a display output showing the data collection produced using the process described in FIG. 17.

FIG. 18 shows a display of the data collected by the process of FIG. 17. Integrated bug display 1800 comprises release query component selection index 1610 and interim build table 1620 (FIG. 16), and an integrated bug table 1810 with each row representing a particular release. Column 1820 contains an interim or maintenance release identifier which uniquely identifies a particular interim or maintenance release and preferably also contains in parenthesis a number representing the number of bugs fixed in the particular release. Column 1830 contains a list of bug identifiers that uniquely identify particular bugs that have been fixed in the release. Column 1840 contains a severity level corresponding to the bug with the identifier in column 1830. Column 1850 contains a brief description of the bug identified by the bug identifier in column 1830.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A method for obtaining software program release information, said method comprising:
   receiving a request for software program release information, said request including a key identifier identifying a defect of a software program;
   gathering software program release information from a release information system in accordance with the key identifier, said software program release information including:
      an identification of at least one major release of the software program;
      an indication of a status of the defect in each major release; and
      information of a scheduled minor release within the major release; and
   displaying said software program release information on an output device.

2. The method of claim 1 wherein said displaying comprises:
   assigning a unique color to each status of the defect; and
   displaying an indicator having said unique color.

3. The method of claim 1 wherein said information of the minor release is obtained from a first database storing release schedule information of the software program; and
   said status of the defect in each major release is obtained from a second database storing release information of the software program.

4. The method of claim 1 wherein said displaying comprises dynamically generating a Web page exhibiting said software program release information.

5. The method of claim 4 wherein said indication of the status of defect in said major release comprises a hyperlink that, when selected, is operable to present information to a user regarding the defect.

6. The method of claim 1 wherein said output device comprises a remote display connected to a network.

7. The method of claim 1 wherein software program release information further comprises a severity level for each of said defects.

8. The method in accordance with claim 1 wherein the status of the defect includes:
   being identified and fixed in the major release; and
   being identified but not fixed in the major release.

9. The method in accordance with claim 8 wherein the status of the defect further includes:
   being identified and to be fixed in the major release.

10. A program storage device readable by a machine, embodying a program of instructions executable by the machine to perform a method for obtaining software program release information, the method comprising:
   receiving a request for software program release information, said request including a key identifier identifying a defect of a software program;
   gathering software program release information from a release information system in accordance with the key identifier, said software program release information including:
      an identification of at least one major release of the software program;
      an indication of a status of the defect in each major release; and
      information of a scheduled minor release within the major release; and
   displaying said software program release information on an output device.

11. An apparatus for obtaining software program release information, said apparatus comprising:
- means for receiving a request for software program release information, said request including a key identifier identifying a defect of a software program;
- means for gathering software program release information from a release information system in accordance with the key identifier, said software program release information including:
  - an identification of at least one major release of the software program;
  - an indication of a status of the defect in each major release; and
  - information of a scheduled minor release within the major release; and
- means for displaying said software program release information on an output device.

12. The apparatus of claim 11 wherein said means for displaying comprises:
- means for assigning a unique color to each status of the defect; and
- means for displaying an indicator having said unique color.

13. The apparatus of claim 11, further comprising:
- means for obtaining said information of the minor release from a first database storing release schedule information of the software program; and
- means for obtaining said indication of the status of the defect in each major release from a second database storing release information of the software program.

14. The apparatus of claim 11 wherein said means for displaying further comprises means for dynamically generating a Web page exhibiting said software program release information.

15. The apparatus of claim 14 wherein said indication of the status of defect in said major release comprises a hyperlink that, when selected, is operable to present information to a user regarding the defect.

16. The apparatus of claim 11 wherein said output device comprises a remote display connected to a network.

17. The method of claim 11 wherein software program release information further comprises a severity level for each of said defects.

18. The method in accordance with claim 11 wherein the status of the defect includes:
- being identified and fixed in the major release; and
- being identified but not fixed in the major release.

19. The method in accordance with claim 18 wherein the status of the defect further includes:
- being identified and to be fixed in the major release.

20. An apparatus for obtaining software program release information, said apparatus comprising:
- a network interface configured to receive a request for software program release information, said request including a key identifier identifying a defect of a software program; and
- at least one Central Processing Unit (CPU) configured to receive said request and return software program release information in accordance with the key identifier, said software program release information including:
  - an identification of at least one major release of the software program;
  - an indication of a status of the defect in each major release; and
  - information of a scheduled minor release within the major release.

21. The apparatus of claim 20 wherein said apparatus is further configured to:
- assign a unique color to each status of the defect; and
- display an indicator having said unique color.

22. The apparatus of claim 20, said apparatus further configured to:
- obtain said information of the minor release from a first database storing release schedule information of the software program; and
- obtain said status of the defect in each major release from a second database storing release information of the software program.

23. The apparatus of claim 20, said apparatus further configured to dynamically generate a Web page exhibiting said software program release information.

24. The apparatus of claim 23 wherein said indication of the status of defect in said major release comprises a hyperlink that, when selected, is operable to present information to a user regarding the defect.

25. The apparatus of claim 20, said apparatus further configured to format said software program release information for display on a remote display connected to a network.

26. The apparatus of claim 20 wherein software program release information further comprises a severity level for each of said defect.

27. A network client for obtaining software program release information, said network client comprising:
- a Web browser configured to request software program release information, said request including a key identifier identifying a defect of a software program, said Web browser further configured to receive software program release information gathered in accordance with the key identifier, said software program release information including:
  - an identification of at least one major release of the software program;
  - an indication of a status of the defect in each major release; and
  - information of a scheduled minor release within the major release; and
- an output device for displaying said software program release information on an output device.

28. A method for obtaining software program release information, said method comprising:
- receiving a request for software program release information, the request including a key identifier; and
- gathering software program release information from a software release information system in accordance with the key identifier, the software program release information including information regarding at least one major release of the software program, the system including:
  - defect information for each defect in the software program, said defect information including a defect identification and description of the defect;
  - release information for each release of the software program, releases of the software program including major releases and minor releases within a major release, said release information including indication of defects fixed in each release and indication of defects known but not fixed in the release; and
  - release schedule information for each release, said release schedule information including at least one minor release date for a major release.

29. The method in accordance with claim 28, further comprising:
   displaying the software program release information on an output device.
30. The method in accordance with claim 29 wherein the key identifier is selected from at least one of:
   a software defect identifier;
   a projected date by which a software defect is to be fixed;
   a software major release identifier; and
   a date identifying a specific week of a certain month.
31. The method in accordance with claim 30 wherein the key identifier is a software defect identifier.
32. The method in accordance with claim 31 wherein said gathering includes:
   determining if a release includes a defect specified by the key identifier;
   obtaining the release schedule information for the release containing the defect; and
   iterating said determining and said obtaining for all releases of the software program.
33. The method in accordance with claim 32 wherein said gathering further includes:
   generating a list of the releases for said iteration.
34. The method in accordance with claim 31 wherein the software program release information includes:
   status of a software defect in each major release.
35. The method in accordance with claim 34 wherein the status includes:
   being identified and fixed in the major release; and
   being identified but not fixed in the major release.
36. The method in accordance with claim 35 wherein the status further includes:
   being identified and to be fixed in the major release.
37. The method in accordance with claim 34, further comprising:
   assigning a unique color to each status of the software defect.
38. The method in accordance with claim 34 wherein the software program release information further includes:
   a minor release and a date thereof scheduled for the major release.
39. The method in accordance with claim 38 wherein the software program release information further includes:
   an interim build and a date thereof scheduled for the major release.
40. The method in accordance with claim 30 wherein the key identifier is a projected date by which a software defect is to be fixed.
41. The method in accordance with claim 40 wherein said gathering includes:
   determining if a major release includes a build date after the projected date;
   obtaining release schedule information for the major release containing a build date after the projected date; and
   iterating said determining and said obtaining for all major releases of the software program.
42. The method in accordance with claim 41 wherein said gathering further includes:
   generating a list of the major releases for said iteration.
43. The method in accordance with claim 41 wherein the software program release information includes:
   a minor release and a date thereof for the major release, the date of the minor release being after the projected date.
44. The method in accordance with claim 43 wherein the software program release information further includes:
   a build and a date thereof for the major release, the date of the build being after the projected date.
45. The method in accordance with claim 44 wherein the software program release information further indicates:
   a cut-off date for a fix of the software defect to be implemented in the minor release.
46. The method in accordance with claim 30 wherein the key identifier is a software major release identifier.
47. The method in accordance with claim 46 wherein said gathering includes:
   obtaining release schedule information for a major release specified by the key identifier.
48. The method in accordance with claim 46 wherein the software program release information includes:
   information of all miner releases in the major release specified by the key identifier.
49. The method in accordance with claim 48 wherein the software program release information further indicates:
   a date for each minor release to be available in a first form of distribution.
50. The method in accordance with claim 49 wherein the first form is downloading from a server.
51. The method in accordance with claim 49 wherein the software program release information further indicates:
   a date for each minor release to be available in a second form of distribution.
52. The method in accordance with claim 51 wherein the second form is inclusion in hardware or in tangible distribution media.
53. The method in accordance with claim 30 wherein the key identifier is a date identifying a specific week of a certain month.
54. The method in accordance with claim 53 wherein said gathering includes:
   determining if a release has a build date within the specific week;
   obtaining a build identification and the build date thereof within the specific week; and;
   iterating said determining and said obtaining for all releases of the software program.
55. The method in accordance with claim 54 wherein said gathering further includes:
   generating a list of the releases for said iteration.
56. The method in accordance with claim 53 wherein the software program release information indicates:
   available builds for the major release during the specific week.
57. An apparatus for obtaining software program release information, said apparatus comprising:
   means for receiving a request for software program release information, the request including a key identifier; and
   means for gathering software program release information from a software release information system in accordance with the key identifier, the software program release information including information regarding at least one major release of the software program, the system including:
   defect information for each defect in the software program, said defect information including a defect identification and description of the defect;
   release information for each release of the software program, releases of the software program including major releases and minor releases within a major release, said release information including indication of defects fixed in each release and indication of defects known but not fixed in the release; and release schedule information for each release, said release schedule information including at least one minor release date for a major release.

58. The apparatus in accordance with claim 57, further comprising:

means for displaying the software program release information on an output device.

59. The apparatus in accordance with claim 58 wherein the output device includes:

a remote display connected to a network.

60. The apparatus in accordance with claim 57 wherein the key identifier is a software defect identifier.

61. The apparatus in accordance with claim 60 wherein said means for gathering includes:

means for determining if a release includes a defect specified by the defect identifier;

means for obtaining the release schedule information for the release containing the defect; and means for iterating said determining and said obtaining for all releases of the software program.

62. The apparatus in accordance with claim 61 wherein said means for gathering further includes:

means for generating a list of the releases for said iteration.

63. The apparatus in accordance with claim 60 wherein the software program release information includes:

status of a software defect in each major release.

64. The apparatus in accordance with claim 63 wherein the status includes:

being identified and fixed in the major release; and being identified but not fixed in the major release.

65. The apparatus in accordance with claim 64 wherein the status further includes:

being identified and to be fixed in the major release.

66. The apparatus in accordance with claim 63, further comprising:

assigning a unique color to each status of the software defect.

67. The apparatus in accordance with claim 63 wherein the software program release information further includes:

a minor release and a date thereof scheduled for the major release.

68. The apparatus in accordance with claim 67 wherein the software program release information further includes:

an interim build and a date thereof scheduled for the major release.

69. The apparatus in accordance with claim 57 wherein the key identifier is a projected date by which a software defect is to be fixed.

70. The apparatus in accordance with claim 69 wherein said means for gathering includes:

means for determining if a major release includes a build date after the projected date;

means for obtaining release schedule information for the major release containing a build date after the projected date; and means for iterating said determining and said obtaining for all major releases of the software program.

71. The apparatus in accordance with claim 70 wherein said means for gathering further includes:

means for generating a list of the major releases for said iteration.

72. The apparatus in accordance with claim 69 wherein the software program release information includes:

a minor release and a date thereof for the major release, the date of the minor release being after the projected date.

73. The apparatus in accordance with claim 72 wherein the software program release information further includes:

a build and a date thereof for the major release, the date of the build being after the projected date.

74. The apparatus in accordance with claim 73 wherein the software program release information further indicates:

a cut-off date for a fix of the software defect to be implemented in the minor release.

75. The apparatus in accordance with claim 57 wherein the key identifier is a software major release identifier.

76. The apparatus in accordance with claim 75 wherein said means for gathering includes:

means for obtaining release schedule information for a major release specified by the key identifier.

77. The apparatus in accordance with claim 75 wherein the software program release information includes:

information of all miner releases in the major release specified by the key identifier.

78. The apparatus in accordance with claim 77 wherein the software program release information further indicates:

a date for each minor release to be available in a first form of distribution.

79. The apparatus in accordance with claim 78 wherein the first form is downloading from a server.

80. The apparatus in accordance with claim 78 wherein the software program release information further indicates:

a date for each minor release to be available in a second form of distribution.

81. The apparatus in accordance with claim 80 wherein the second form is inclusion in hardware or in tangible distribution media.

82. The apparatus in accordance with claim 57 wherein the key identifier is a date identifying a specific week of a certain month.

83. The apparatus in accordance with claim 82 wherein said means for gathering includes:

means for determining if a release has a build date within the specific week;

means for obtaining a build identification and the build date thereof within the specific week; and;

means for iterating said determining and said obtaining for all releases of the software program.

84. The apparatus in accordance with claim 83 wherein said means for gathering further includes:

means for generating a list of the releases for said iteration.

85. The apparatus in accordance with claim 82 wherein the software program release information indicates:

available builds for the major release during the specific week.

86. A program storage device readable by a machine, tangibly embodying a program of instructions executable by the machine to perform a method for obtaining software program release information, the method including:

receiving a request for software program release information, the request including a key identifier;

gathering software program release information from a software release information system in accordance with the key identifier, the software program release information including information regarding at least one major release of the software program, the system including:
  defect information for each defect in the software program, said defect information including a defect identification and description of the defect;
  release information for each release of the software program, releases of the software program including major releases and minor releases within a major release, said release information including indication of defects fixed in each release and indication of defects known but not fixed in the release; and
  release schedule information for each release, said release schedule information including at least one minor release date for a major release; and
displaying the software program release information on an output device.

87. The program storage device in accordance with claim 86 wherein the key identifier is selected from at least one of:
  a software defect identifier;
  a projected date by which a software defect is to be fixed;
  a software major release identifier; and
  a date identifying a specific week of a certain month.

88. An apparatus for obtaining software program release information, said apparatus comprising:
  a network interface configured to receive a request for software program release information, the request including a key identifier; and
  at least one central processing unit (CPU) configured to receive the request, gather, in response to the request, software program release information from a software release information system in accordance with the key identifier, and return the software program release information, the software program release information including information regarding at least one major release of the software program, the system including:
    defect information for each defect in the software program, said defect information including a defect identification and description of the defect;
    release information for each release of the software program, releases of the software program including major releases and minor releases within a major release, said release information including indication of defects fixed in the release and indication of defects known but not fixed in the release; and
    release schedule information for each release, said release schedule information including at least one minor release date for a major release.

89. The apparatus in accordance with claim 88 wherein said interface is further configured to display the received software program release information on an output device.

90. The apparatus in accordance with claim 88 wherein the key identifier is selected from at least one of:
  a software defect identifier;
  a projected date by which a software defect is to be fixed;
  a software major release identifier; and
  a date identifying a specific week of a certain month.

91. The apparatus in accordance with claim 88 wherein the key identifier is a software defect identifier, and wherein the received software program release information includes:
  status of a software defect in each major release.

92. The apparatus in accordance with claim 91 wherein said CPU is further configured to assign a unique color to each status of the software defect.

93. The apparatus in accordance with claim 91 wherein the software program release information further includes:
  a minor release and a date thereof scheduled for the major release.

94. The apparatus in accordance with claim 93 wherein the software program release information further includes:
  an interim build and a date thereof scheduled for the major release.

95. The apparatus in accordance with claim 88 wherein the key identifier is a projected date by which a software defect is to be fixed, and wherein the software program release information includes:
  a minor release and a date thereof for the major release, the date of the minor release being after the projected date.

96. The apparatus in accordance with claim 95 wherein the software program release information further includes:
  a build and a date thereof for the major release, the date of the build being after the projected date.

97. The apparatus in accordance with claim 96 wherein the software program release information further indicates:
  a cut-off date for a fix of the software defect to be implemented in the minor release.

98. The apparatus in accordance with claim 88 wherein the key identifier is a software major release identifier, and wherein the software program release information includes:
  information of all miner releases in the major release specified by the key identifier.

99. The apparatus in accordance with claim 98 wherein the software program release information further indicates:
  a date for each minor release to be available in a first form of distribution.

100. The apparatus in accordance with claim 96 wherein the software program release information further indicates:
  a date for each minor release to be available in a second form of distribution.

101. The apparatus in accordance with claim 88 wherein the key identifier is a date identifying a specific week of a certain month, and wherein the software program release information indicates:
  available builds for the major release during the specific week.

102. A network client for obtaining software program release information, said network client comprising:
  a Web browser configured to request software program release information, the request including a key identifier, said Web browser being further configured to receive the software program release information gathered from a software release information system in accordance with the key identifier, the software program release information including information regarding at least one major release of the software program, the system including:
    defect information for each defect in the software program, said defect information including a defect identification and description of the defect;
    release information for each release of the software program, releases of the software program including major releases and minor releases within a major release, said release information including indication of defects fixed in the release and indication of defects known but not fixed in the release; and
    release schedule information for each release, said release schedule information including at least one minor release date for a major release; and an output device displaying the received software program release information.

103. The network client in accordance with claim 102 wherein the key identifier is selected from at least one of:
   a software defect identifier;
   a projected date by which a software defect is to be fixed;
   a software major release identifier; and
   a date identifying a specific week of a certain month.

104. The apparatus in accordance with claim 103 wherein the received software program release information includes:
   status of a software defect in each major release, the software defect being specified by the key identifier.

105. The apparatus in accordance with claim 104 wherein the software program release information further includes:
   a minor release and a date thereof scheduled for the major release.

106. The apparatus in accordance with claim 105 wherein the software program release information further includes:
   an interim build and a date thereof scheduled for the major release.

107. The apparatus in accordance with claim 103 wherein the key identifier specifies a projected date by which a software defect is to be fixed, and wherein the software program release information includes:
   a minor release and a date thereof for the major release, the date of the minor release being after the projected date.

108. The apparatus in accordance with claim 107 wherein the software program release information further includes:
   a build and a date thereof for the major release, the date of the build being after the projected date.

109. The apparatus in accordance with claim 108 wherein the software program release information further indicates:
   a cut-off date for a fix of the software defect to be implemented in the minor release.

110. The apparatus in accordance with claim 103 wherein the key identifier is a software major release identifier, and wherein the software program release information includes:
   information of all miner releases in the major release specified by the key identifier.

111. The apparatus in accordance with claim 110 wherein the software program release information further includes:
   a date for each minor release to be available in a first form of distribution.

112. The apparatus in accordance with claim 111 wherein the software program release information further indicates:
   a date for each minor release to be available in a second form of distribution.

113. The apparatus in accordance with claim 102 wherein the key identifier is a date identifying a specific week of a certain month, and wherein the software program release information indicates:
   available builds for the major release during the specific week.

* * * * *